May 16, 1967 R. BRADBURY 3,320,225
METHOD OF MANUFACTURING A PLASTIC HINGE
Filed Feb. 8, 1965
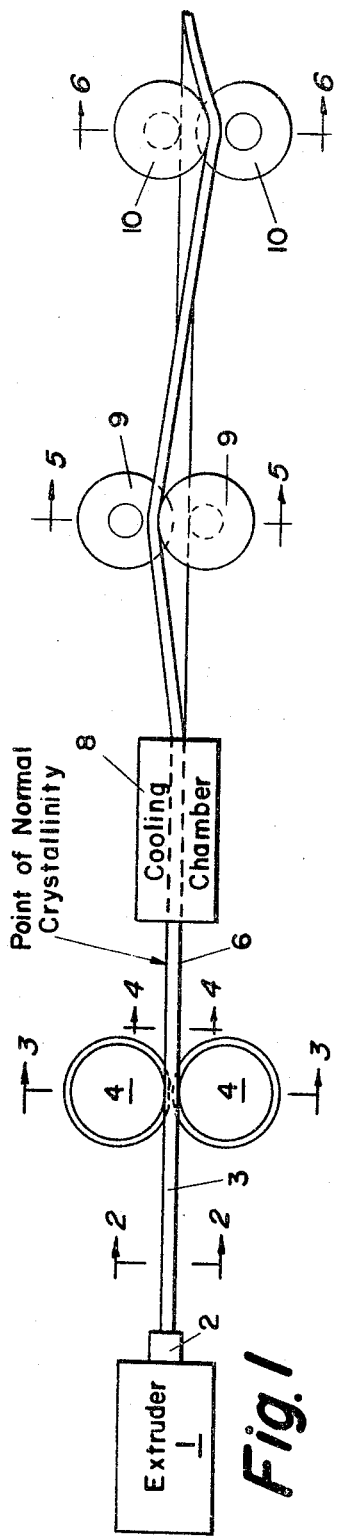
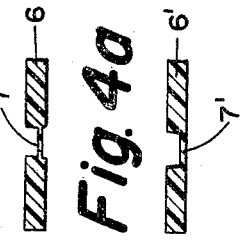
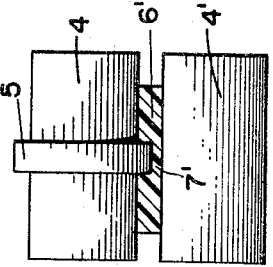
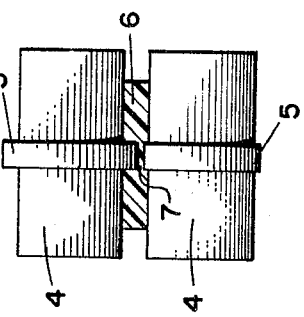
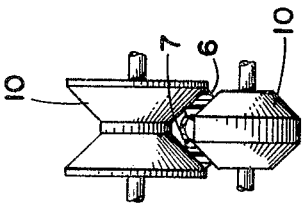
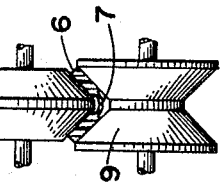

United States Patent Office 3,320,225
Patented May 16, 1967

3,320,225
METHOD FOR MANUFACTURING A
PLASTIC HINGE
Roy Bradbury, Morrisville, Pa., assignor to The Electric Storage Battery Company, a corporation of New Jersey
Filed Feb. 8, 1965, Ser. No. 430,870
8 Claims. (Cl. 260—93.7)

This invention relates to a method for manufacturing a plastic hinge. In particular, it relates to a method for fabricating certain thermoplastic materials into continuous hinge sections by a continuous extrusion and post-die forming process.

The linear alignment of the molecular chain in some thermoplastic materials, particularly in the polyolefin group, combined with the high degree of orientation induced by the extrusion process results in a finished product consisting of long molecular chains with amorphous material between the chains. The molecular chains are generally aligned in the direction of the extrudate flow from the extruder die. The ability of the thermoplastic material to resist fatigue, particularly while undergoing repeated flexing, is dependent upon the oriented molecular structure rather than the amorphous material. Therefore, in order to manufacture a thermoplastic hinge, it is necessary to impart a certain degree of molecular orientation across the line of extrusion in that section of the thermoplastic material through which the bending moment will occur.

It is virtually impossible to effect a sufficient and permanent molecular orientation of the thermoplastic material across the line of extrusion at the die of the extruder. A reduction of the cross-section in the die lips will not yield a hinge section having sufficient strength if the extrusion is carried out under normal extrusion conditions. It is an object of this invention to provide a method for manufacturing a plastic hinge by a continuous extrusion process.

Another object of the invention is to provide a continuous extrusion and post-die forming process for manufacturing a thermoplastic hinge which can withstand repeated flexing.

Other objects and purposes of this invention will be apparent to those skilled in the art in view of the following description, and particularly in view of the drawings, in which:

FIGURE 1 is a flow diagram illustrating the several steps of the method of this invention in their proper sequence;

FIGURE 2 is a cross-sectional view of the extrudate taken at line 2—2;

FIGURE 3 is a cross-sectional view of the extrudate and the continuous pressure rolls taken at line 3—3;

FIGURE 3a is a cross-sectional view of the extrudate and the continuous pressure rolls taken at line 3—3 using a different set of continuous pressure rolls;

FIGURE 4 is a cross-sectional view of the extrudate taken at line 4—4;

FIGURE 4a is a cross-sectional view of the extrudate taken at line 4—4 using the continuous pressure rolls illustrated in FIGURE 3a;

FIGURE 5 is a cross-sectional view of the extrudate and a first set of flexing rolls taken at line 5—5; and FIGURE 6 is a cross-sectional view of the extrudate and a second set of flexing rolls taken at line 6—6.

It has been discovered that a plastic hinge, capable of withstanding repeated flexing, can be manufactured from a thermoplastic material by a continuous extrusion process utilizing a post-die method of reorienting the molecular chains in that area of the thermoplastic material through which the bending moment will occur. The reorientation is effected by passing the extruded thermoplastic material between a pair of continuous pressure rolls which have projections that reduce the cross-section and reorient the molecular chains in a portion of the thermoplastic material. The pressure rolls are designed to mechanically induce orientation of the molecular chains across the line of extrusion, which is accomplished by forcing some of the thermoplastic material out from between the projections and thereby reducing the cross-section.

The location of the pressure rolls relative to the extruder die orifice is critical and must be closely controlled, for the point in the process at which the reorientation should be induced is a function of extrusion speed, extrudate temperature as it leaves the die orifice and the specific heat of the thermoplastic material. If the extrudate is too hot at the reorientation point, the molecular chains of the thermoplastic material subsequently tend to realign, i.e. the reorientation is not permanent, which impairs the ability of the material to withstand repeated flexing. In the event that the extrudate is too cold and crystallinity has commenced at the point of reorientation, the thermoplastic material must be reheated in order to effect a reorientation of the molecular chains.

The extrusion and post-die forming method of this invention may be applied to thermoplastic strip material, that is material having a regular cross-section such as rectangular, or to profile material which has an irregular cross-section as it leaves the extruder die. It should be noted that the essence of this invention relates to the treatment of a thermoplastic material to effect a reorientation so as to increase the flexural strength, and it is not based on the particular type or shape of thermoplastic material.

A further and more specific description of the method of this invention may be had by referring to the drawings. FIGURE 1 is a flow diagram illustrating the several steps of the method of this invention in their proper sequence. A thermoplastic material is fed into an extruder 1 and forced through an extrusion die 2. The extrudate 3 is in the form of a hot, soft strip or profile of thermoplastic material, such as the strip material having a rectangular cross-section illustrated in FIGURE 2.

Spaced from the extrusion die 2 are a pair of continuous pressure rolls 4 between which the warm and soft extrudate 3 is passed. The rolls 4 apply constant pressure to the soft thermoplastic extrudate on the portion at which the molecular chain reorientation is desired. Since the extrudate is still warm, it is preferred that the rolls 4, which are power driven, have their temperature controlled with water so that the extrudate can be hardened or solidified to lock in or stabilize the reorientation. The configuration of the continuous pressure rolls 4 is clearly illustrated in FIGURE 3. The projections 5 which extend from the rolls engage the extrudate 3 so as to compress the thermoplastic material from both sides to form the thermoplastic extrudate 6 having a compressed portion 7. It should be noted that the distance which the projections 5 extend is not critical, though it is generally preferred that the extrudate have a greater depression on one surface than on the other, i.e. the reduction in thickness is not symmetrical around the lateral center line of the extrudate (see FIGURE 4). In addition, the top and bottom of the reoriented portion should be parallel surfaces.

Instead of using two continuous pressure rolls with projections, only one of the rolls need have a projection as shown in FIGURE 3a. In this case, one roll 4 has a projection 5 whereas the other roll 4' has no projection and is smooth. The resulting thermoplastic extrudate 6' has a compressed portion 7' which is impressed from only one side. This is clearly illustrated in FIGURE 4a.

As previously stated, the location of the pressure rolls 4 is essential to this invention. The rolls are spaced from the extrusion die 2 and must contact the thermoplastic extrudate 3 prior to the point of normal crystallinity. The distance of the pressure rolls from the extrusion die is generally determined by the temperature of the extrudate as it leaves the die, the speed of extrusion and the specific heat of the thermoplastic material. A general rule which may be used to determine the pressure roll location is to observe the point at which crystallinity is apparent in the strip (the thermoplastic material will start to become opaque) and place the rolls at a point approximately 6–8 inches closer to the extrusion die. If the thermoplastic material contains a coloring pigment this visual method cannot be used for the material will be opaque as it leaves the die. In this case, an unpigmented sample of the same material may be used to determine the pressure roll location.

As illustrated in FIGURE 4, a portion of the thermoplastic strip is compressed by the continuous pressure rolls, and in this compressed portion the molecular chains are reoriented. The pressure rolls have projections to effect the desired degree of reorientation. The thickness of the reoriented section is a function of the mean thickness of the extrudate and will vary depending upon the thermoplastic material and the particular application. In general, it has been found satisfactory to provide thermoplastic hinges having a mean thickness in the uncompressed portion of about 0.1 inch with a reoriented section thickness of about 0.018 to about 0.024 of an inch. The width of the reoriented section may vary to meet different requirements but should be at least about 0.15 inch. These dimensions are not critical and depend upon the particular thermoplastic material and the particular application.

After the thermoplastic extrudate has been compressed and reoriented, it may be passed through a cooling chamber 8 to further cool the extrudate. This special cooling procedure is not essential to the invention, but it may be useful if rapid cooling is desired, such as when the extrudate is to undergo further treatment. The cooling chamber may comprise a trough filled with water through which the extrudate is passed.

Following the reorientation of the thermoplastic material and the cooling thereof, it is particularly preferred that the extrudate be hot flexed by passing it through two sets of flexing rolls 9 and 10 while it is still warm. The first set of rolls 9 flex the hinge above the lateral center line (see FIGURE 5), and the second set of rolls 10 flex the hinge below the lateral center line (see FIGURE 6). It is a matter of operator's choice as to whether these rolls are power driven and/or water cooled and the order of the upward and downward flexing. Though this flexing treatment is not essential, it is definitely preferred that the extrudate be flexed in this manner prior to final cooling. This hot flexing treatment partially reorients the molecular chains which are disrupted by the compressive force of the continuous pressure rolls. The flexing treatment must be performed while the strip is still warm, i.e. substantially above room temperature. As a result, the plastic hinge material has improved tear resistance and flex strength. The omission of this flexing treatment may result in a hinge material which cracks during a high rate of loading.

The hinges made in accordance with the method of this invention are prepared from thermoplastic resins. Not all thermoplastic resins may be used, for some resins do not respond to this process. Thermoplastic resins which have been found to be suitable are olefin polymers, such as polypropylene and high density polyethylene, and copolymers thereof. As previously mentioned, this invention is not limited by the particular type of thermoplastic material which is treated in accordance with these unique procedures. One of the advantages of plastic hinges made in accordance with this invention is that they can be manufactured in continuous lengths, in a variety of colors, and the color is an inherent part of the plastic and will not scratch off. Another advantage is that this type of plastic hinge is readily secured in position, such as by nailing or stapling, and it also serves as an excellent weather strip.

The following example illustrates the manufacture of a plastic hinge in accordance with this invention:

Example 1

A polypropylene hinge was manufactured utilizing equipment substantially as illustrated in FIGURE 1. Both continuous pressure rollers had a projection, as illustrated in FIGURE 3, and in addition, pullers to keep the polypropylene extrudate moving through the manufacturing line were placed after the cooling chamber, which comprised a trough of water into which the extrudate was immersed. After the polypropylene extrudate was flexed by the two sets of flexing rollers, it was wound into coils by means of an automatic winder.

The various pieces of apparatus were carefully positioned so as to provide the proper spacing. The extruder was set in place, and the edge of the continuous pressure rolls nearest to the extruder was spaced about 6 inches from the extruder die. The trough of water having a length of 5 feet which comprised the cooling chamber was positioned about 6 inches from the nearest edge of the continuous pressure rolls. The puller which was placed after the cooling chamber was spaced about 2 feet therefrom. The first set of flexing rolls was spaced about 5 feet from the puller, and the second set of flexing rolls was spaced about 2 feet from the first set. The automatic winder which wound the polypropylene extrudate into coils was located about 6 feet from the second set of flexing rolls.

Polypropylene was fed to a hopper on top of the extruder barrel. The polypropylene was transferred from the hopper to the extruder barrel which was maintained at a temperature of from about 400 to 425° F. The extruder screw, operating at 27 r.p.m., plasticated and transferred the polypropylene to the die end of the extruder barrel where it was forced through a 2 inch by 3/16 inch rectangular die. Thereafter, the polypropylene extrudate was passed to the continuous pressure rolls which were maintained at a temperature of about 80° F. by running 50° F. water through the rolls.

After the central portion of the extrudate was reoriented and compressed by the continuous pressure rolls, the polypropylene extrudate was passed into the cooling chamber which comprised a trough continuously fed with water. The extrudate was cooled by immersing it in the water, and thereafter, it was passed through a puller which helped to maintain the speed of the extrudate at about 16 feet per minute. In order to increase the tear resistance and flex strength of the polypropylene extrudate, it was passed through two sets of flexing rolls, one of which flexed the extrudate above the lateral center line through 90° and the other flexed it below the lateral center line through 90°. The flexing treatment was performed while the polypropylene extrudate was still substantially above room temperature, i.e. it was a hot flexing treatment. After the hot flexing treatment, the polypropylene was automatically wound into coils.

Having completedly described this invention, what is claimed is:

1. A method for manufacturing a plastic hinge which comprises feeding an olefin polymer material into an extruder, forcing the olefin polymer material through an extrusion die to form an extrudate, passing the hot and soft extrudate between a pair of continuous pressure rolls, at least one of said continuous pressure rolls having a groove forming projection which compresses the extrudate and reorients the molecular chains across the line of extrusion by permanently forming a groove in the extrudate, said pressure rolls contacting the extrudate at a temperature above its crystalline melting point, substantially immediately after reorientation cooling the extrudate to a temperature below its crystaline melting point to lock in the reorientation, and recovering an extruded olefin polymer strip material having a groove formed in the central portion thereof on at least one side of said olefin polymer strip material which has sufficient flexural strength to be useful as a hinge.

2. A method in accordance with claim 1 in which the olefin polymer material is polypropylene.

3. A method in accordance with claim 1 in which both continuous pressure rolls have a groove forming projection.

4. A method in accordance with claim 1 in which only one of the continuous pressure rolls has a groove forming projection.

5. A method in accordance with claim 1 in which the continuous pressure rolls are cooled in order to cool the extrudate to a temperature below its crystalline melting point immediately after it is reoriented by compression.

6. A method in accordance with claim 1 in which the olefin polymer strip, after it is reoriented and cooled but it still substantially above room temperature, is passed through two sets of rolls, one of which flexes the strip above its lateral center line and the other flexes the strip below its lateral center line.

7. A method in accordance with claim 2 in which the polypropylene strip, after it is reoriented and cooled but is still substantially above room temperature, is passed through two sets of rolls, one of which flexes the strip above its lateral center line and the other flexes the strip below its lateral center line.

8. A thermoplastic strip material which is made into a hinge in accordance with the method of claim 1.

References Cited by the Examiner
UNITED STATES PATENTS

| | | | |
|---|---|---|---|
| 2,746,087 | 5/1956 | Dolezal | 264 |
| 2,848,751 | 8/1958 | Vernon | 264—285 |
| 3,009,169 | 11/1961 | Bodner | 4—240 |
| 3,019,486 | 2/1962 | Stinson | 264 |
| 3,068,136 | 12/1962 | Reid | 264—285 |
| 3,089,187 | 5/1963 | Wolfe | 264 |
| 3,103,170 | 9/1963 | Covington et al. | 102—43 |
| 3,104,937 | 9/1963 | Wyckoff et al. | 264—178 |
| 3,144,430 | 8/1964 | Schaffhausen | 260—45.5 |

ROBERT F. WHITE, *Primary Examiner.*

S. H. HELLER, G. AUVILLE, *Assistant Examiners.*